US009111548B2

(12) United States Patent
Nandy et al.

(10) Patent No.: US 9,111,548 B2
(45) Date of Patent: Aug. 18, 2015

(54) SYNCHRONIZATION OF BUFFERED DATA IN MULTIPLE MICROPHONES (71) Applicant: Knowles Electronics, LLC, Itasca, IL (US)

(72) Inventors: Dibyendu Nandy, Naperville, IL (US); Robert A. Popper, Lemont, IL (US); Yang Li, Schaumburg, IL (US); Sarmad Qutub, DesPlaines, IL (US); Claus Erdmann Furst, Roskilde (DK); Henrik Thomsen, Holte (DK)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 14/533,674

(22) Filed: Nov. 5, 2014

(65) Prior Publication Data
US 2015/0055799 A1 Feb. 26, 2015

Related U.S. Application Data (63) Continuation-in-part of application No. 14/282,101, filed on May 20, 2014.

(60) Provisional application No. 61/901,832, filed on Nov. 8, 2013, provisional application No. 61/826,587, filed on May 23, 2013.

(51) Int. Cl.
*G10L 25/78* (2013.01)
*H04R 3/00* (2006.01)
*G10L 15/00* (2013.01)
*H04R 19/00* (2006.01)
*H04R 19/04* (2006.01)

(52) U.S. Cl.
CPC ............. *G10L 25/78* (2013.01); *G10L 15/00* (2013.01); *H04R 3/005* (2013.01); *H04R 19/005* (2013.01); *H04R 19/04* (2013.01)

(58) Field of Classification Search
CPC .......... H04R 3/00; G10L 15/22; G10L 15/32; G10L 2015/223
USPC ................ 381/26, 91–95, 111 700/94; 700/94
See application file for complete search history.

(56) References Cited

U.S. PATENT DOCUMENTS

2002/0054588 A1* 5/2002 Mehta et al. .................. 370/352
2005/0195975 A1* 9/2005 Kawakita ....................... 380/30

(Continued)

FOREIGN PATENT DOCUMENTS

JP 2001236095 A 8/2001

OTHER PUBLICATIONS

International Search Report for PCT/EP2014/038790, dated Sep. 24, 2014, 9 pages.

*Primary Examiner* — Fan Tsang
*Assistant Examiner* — Eugene Zhao
(74) *Attorney, Agent, or Firm* — Fitch, Even, Tabin & Flannery LLP (57) ABSTRACT

First analog signals are received from a first microphone, converted into first digital data and stored in a first buffer. A determination is made as to whether voice activity has occurred when voice activity is determined, a voice activity detect signal is sent to an external processor. The external processor responsively provides an exterior clock signal upon receiving the voice activity detect signal. Second analog signals are received from a second microphone, converted into second digital data and stored in a second buffer. The first digital data in the first buffer is not necessarily synchronized in real time with the second digital data in the second buffer. The first digital data from the first buffer and the second digital data from the second buffer is decimated using the external clock to provide decimated output data, the decimated output data having the first digital data and the second digital data aligned in real time.

18 Claims, 7 Drawing Sheets

(56) References Cited

U.S. PATENT DOCUMENTS

| | | |
|---|---|---|
| 2006/0233389 A1 | 10/2006 | Mao et al. |
| 2007/0168908 A1* | 7/2007 | Paolucci et al. ............... 717/100 |
| 2008/0089536 A1 | 4/2008 | Josefsson |
| 2010/0057474 A1* | 3/2010 | Kong ............................ 704/500 |
| 2011/0208520 A1 | 8/2011 | Lee |
| 2012/0250881 A1 | 10/2012 | Mulligan |
| 2014/0278435 A1* | 9/2014 | Ganong et al. ................ 704/275 |
| 2015/0049884 A1 | 2/2015 | Ye |

* cited by examiner

| Transition | Requirements | Transition | Requirements |
|---|---|---|---|
| A1 | Apply Vdd<br>No clock on clock input pin | A1' | Remove Vdd |
| A2 | Apply Vdd<br>Apply 512kHz clock to clock imput pin | A2' | Remove Vdd |
| B1 | Acoustic Event Trigger | B1' | No Acoustic Activity for OTP programmed amount of time |
| B2 | Acoustic Event Trigger | B2' | No Acoustic Activity for OTP programmed amount of time |
| C | NO PATH IN THIS DIRECTION, BUFFER IS NOT VALID<br>MUST Go through E1' or E2' | C' | Clock Detected on Clock Pin > 1MHz |
| D | Remove Vdd | D' | Apply Vdd<br>Clock Input > 1MHz |
| E1 | Clock Detected > 1MHz | E1' | No Clock on Clock pin |
| E2 | Clock Detected > 1MHz | E2' | Clock Detected at 512kHz |
| E3 | Clock Detected at 512kHz | E3' | No Clock on Clock pin |

SYNCHRONIZATION OF BUFFERED DATA IN MULTIPLE MICROPHONES

CROSS REFERENCE TO RELATED APPLICATION

This patent claims benefit under 35 U.S.C. §119 (e) to U.S. Provisional Application No. 61/901,832 entitled "Microphone and Corresponding Digital Interface" filed Nov. 8, 2013, the content of which is incorporated herein by reference in its entirety. This patent is a continuation-in-part of U.S. application Ser. No. 14/282,101 entitled "VAD Detection Microphone and Method of Operating the Same" filed May 20, 2014, which claims priority to U.S. Provisional Application No. 61/826,587 entitled "VAD Detection Microphone and Method of Operating the Same" filed May 23, 2013, the content of both is incorporated by reference in its entirety.

TECHNICAL FIELD

This application relates to acoustic activity detection (AAD) approaches and voice activity detection (VAD) approaches, and their interfacing with other types of electronic devices.

BACKGROUND OF THE INVENTION

Voice activity detection (VAD) approaches are important components of speech recognition software and hardware. For example, recognition software constantly scans the audio signal of a microphone searching for voice activity, usually, with a MIPS intensive algorithm. Since the algorithm is constantly running, the power used in this voice detection approach is significant.

Microphones are also disposed in mobile device products such as cellular phones. These customer devices have a standardized interface. If the microphone is not compatible with this interface it cannot be used with the mobile device product.

Many mobile devices products have speech recognition included with the mobile device. However, the power usage of the algorithms are taxing enough to the battery that the feature is often enabled only after the user presses a button or wakes up the device. In order to enable this feature at all times, the power consumption of the overall solution must be small enough to have minimal impact on the total battery life of the device. As mentioned, this has not occurred with existing devices.

Because of the above-mentioned problems, some user dissatisfaction with previous approaches has occurred.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that integrate voice activity detection (VAD) or acoustic activity detection (AAD) approaches into microphones. At least some of the microphone components (e.g., VAD or AAD modules) are disposed at or on an application specific circuit (ASIC) or other integrated device. The integration of components such as the VAD or AAD modules significantly reduces the power requirements of the system thereby increasing user satisfaction with the system. An interface is also provided between the microphone and circuitry in an electronic device (e.g., cellular phone or personal computer) in which the microphone is disposed. The interface is standardized so that its configuration allows placement of the microphone in most if not all electronic devices (e.g. cellular phones). The microphone operates in multiple modes of operation including a lower power mode that still detects acoustic events such as voice signals.

In many of these embodiments, first analog signals are received from a first microphone, the first analog signals are converted into first digital data and the first digital data is stored in a first buffer using a first internal clock. Second analog signals are received from a second microphone according to a second internal clock, the second analog signal are converted into second digital data and the second digital data is stored in a second buffer. The first digital data in the first buffer is not necessarily synchronized in real time with the second digital data in the second buffer A determination is made as to whether voice activity has occurred at a first acoustic activity detect (AAD) module based upon the first digital data. When voice activity is determined, a voice activity detect signal is transmitted to an external processor, and the external processor responsively provides an exterior clock signal upon receiving the voice activity detect signal. The first digital data from the first buffer and the second digital data from the second buffer is decimated using the external clock to provide decimated output data, and the decimated output data has the first digital data and the second digital data aligned in real time.

In other aspects, the external clock is received at the first microphone and the second microphone, and the operation of the first microphone and the second microphone is synchronized to the external clock. In some other aspects, subsequent to decimating the first digital data and the second digital data, two channel voice signal enhancement is performed with the decimated output data from the first microphone and the second microphone.

In some examples, converting the first analog signal into a first digital signal comprises converting the first analog signal into PDM data and then to PCM data. In other examples, the second microphone and not the first microphone is kept in a low power or sleep mode until an external clock is applied by the external processor In some aspects, the external processor includes a decimator and the decimator is configured to decimate two or more channels using the same clock, and same sample synchronization signal or Word Strobe (WS). In some other examples, the first microphone, the second microphone, and a multiplicity of additional microphones are connected via a common clock line and multiple serial PDM data lines to the external processor.

In some aspects, the first microphone includes a first buffer and the first microphone is kept in a sensing mode with the first AAD module and first buffer being active. In other aspects, the second microphone and any additional microphones and not the first microphone is kept in a low power or sleep mode until an external clock is applied by the external processor. In other examples, subsequent to decimating the digital data from the first microphone, the second microphone, and a multiplicity of additional microphones, multiple channel voice signal enhancement is performed with the decimated output data from the first microphone, the second microphone, and the third microphone.

In others of these embodiments, an apparatus includes an external processor; a first buffer coupled to the external processor; a second buffer coupled to the external processor; and a first analog-to-digital converter coupled to the first buffer. The first analog-to-digital converter is configured to receive first analog signals from a first microphone, convert the first analog signals into first digital data and store the first digital data in a first buffer. The apparatus also includes a first acoustic activity detect (AAD) module coupled to the first analog-to-digital converter. The first acoustic activity detect module is configured to determine whether voice activity has occurred based upon the first digital data, and when voice activity is determined, transmit a voice activity detect signal to the external processor. The external processor responsively provides an exterior clock signal upon receiving the voice activity detect signal. The apparatus also includes a second analog-to-digital converter coupled to the second buffer. The second analog-to-digital converter is configured to receive a second analog signals from a second microphone according to the external clock, convert the second analog signals into second digital data and store the second digital data in a second buffer. The first digital data in the first buffer is not necessarily synchronized in real time with the second digital data in the second buffer. The first buffer, the first analog-to-digital converter, and the first acoustic activity detect module are disposed at a first microphone, and wherein the second buffer and the second analog-to-digital converter are disposed at a second microphone. The external processor is configured to decimate the first digital data from the first buffer and the second digital data from the second buffer using the external clock to provide decimated output data. The decimated output data has the first digital data and the second digital data aligned in real time.

In some examples, the external clock is received at the first microphone and the second microphone, and the operation of the first microphone and the second microphone is synchronized to the external clock. In other examples, subsequent to decimating the first digital data and the second digital data, two channel voice signal enhancement is performed with the decimated output data from the first microphone and the second microphone.

In some examples, the first analog signal is converted into PDM data and then to PCM data. In other examples, the second microphone and not the first microphone are kept in a low power sleep mode until an external clock is applied by the external processor.

In other examples, the external processor includes a decimator and the decimator is configured to decimate two or more channels using the same clock, and same sample synchronization signal or Word Strobe (WS).

In other aspects, the first microphone, the second microphone, and a multiplicity of additional microphones are connected via a common clock line and multiple serial PDM data lines to the external processor. In other examples, the first microphone is kept in sensing mode with the first AAD module and first buffer being active. In still other examples, the second microphone and any additional microphones and not the first microphone are kept in a low power sleep mode until an external clock is applied by the external processor. In other aspects, subsequent to decimating the digital data from the first microphone, the second microphone, and a multiplicity of additional microphones, multiple channel voice signal enhancement is performed with the decimated output data from the first microphone, the second microphone, and the third microphone.

Figure 1A:
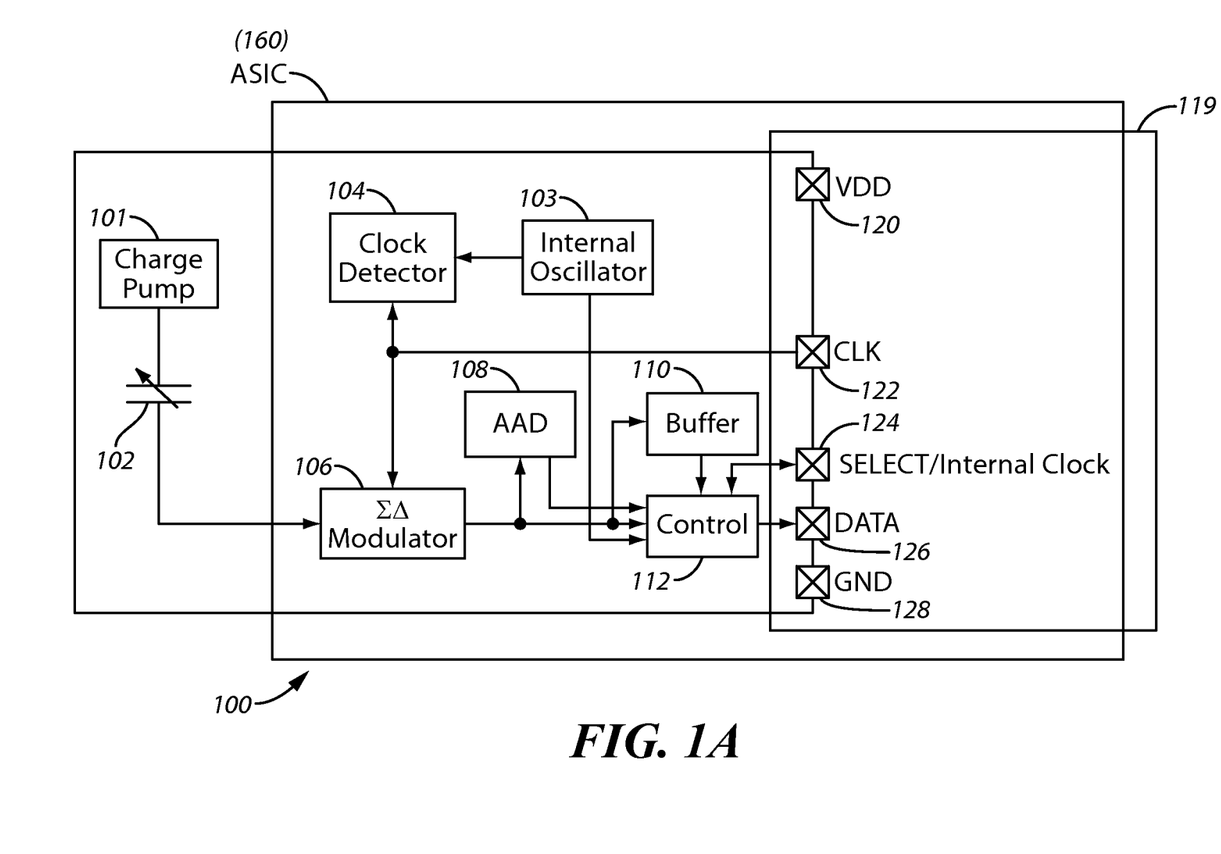
FIG. 1A comprises a block diagram of an acoustic system with acoustic activity detection (AAD) according to various embodiments of the present invention.

Referring now to FIG. 1A, a microphone apparatus 100 includes a charge pump 101, a capacitive microelectromechanical system (MEMS) sensor 102, a clock detector 104, a sigma-delta modulator 106, an acoustic activity detection (AAD) module 108, a buffer 110, and a control module 112. It will be appreciated that these elements may be implemented as various combinations of hardware and programmed software and at least some of these components can be disposed on an ASIC.

The charge pump 101 provides a voltage to charge up and bias a diaphragm of the capacitive MEMS sensor 102. For some applications (e.g., when using a piezoelectric device as a sensor), the charge pump may be replaced with a power supply that may be external to the microphone. A voice or other acoustic signal moves the diaphragm, the capacitance of the capacitive MEMS sensor 102 changes, and voltages are created that becomes an electrical signal. In one aspect, the charge pump 101 and the MEMS sensor 102 are not disposed on the ASIC (but in other aspects, they may be disposed on the ASIC). It will be appreciated that the MEMS sensor 102 may alternatively be a piezoelectric sensor, a speaker, or any other type of sensing device or arrangement.

The clock detector 104 controls which clock goes to the sigma-delta modulator 106 and synchronizes the digital section of the ASIC. If external clock is present, the clock detector 104 uses that clock; if no external clock signal is present, then the clock detector 104 use an internal oscillator 103 for data timing/clocking purposes.

The sigma-delta modulator 106 converts the analog signal into a digital signal. The output of the sigma-delta modulator 106 is a one-bit serial stream, in one aspect. Alternatively, the sigma-delta modulator 106 may be any type of analog-to-digital converter.

The buffer 110 stores data and constitutes a running storage of past data. By the time acoustic activity is detected, this past additional data is stored in the buffer 110. In other words, the buffer 110 stores a history of past audio activity. When an audio event happens (e.g., a trigger word is detected), the control module 112 instructs the buffer 110 to spool out data from the buffer 110. In one example, the buffer 110 stores the previous approximately 180 ms of data generated prior to the activity detect. Once the activity has been detected, the microphone 100 transmits the buffered data to the host (e.g., electronic circuitry in a customer device such as a cellular phone).

The acoustic activity detection (AAD) module 108 detects acoustic activity. Various approaches can be used to detect such events as the occurrence of a trigger word, trigger phrase, specific noise or sound, and so forth. In one aspect, the module 108 monitors the incoming acoustic signals looking for a voice-like signature (or monitors for other appropriate characteristics or thresholds). Upon detection of acoustic activity that meets the trigger requirements, the microphone 100 transmits a pulse density modulation (PDM) stream to wake up the rest of the system chain to complete the full voice recognition process. Other types of data could also be used.

The control module 112 controls when the data is transmitted from the buffer. As discussed elsewhere herein, when activity has been detected by the AAD module 108, then the data is clocked out over an interface 119 that includes a VDD pin 120, a clock pin 122, a select pin 124, a data pin 126 and a ground pin 128. The pins 120-128 form the interface 119 that is recognizable and compatible in operation with various types of electronic circuits, for example, those types of circuits that are used in cellular phones. In one aspect, the microphone 100 uses the interface 119 to communicate with circuitry inside a cellular phone. Since the interface 119 is standardized as between cellular phones, the microphone 100 can be placed or disposed in any phone that utilizes the standard interface. The interface 119 seamlessly connects to compatible circuitry in the cellular phone. Other interfaces are possible with other pin outs. Different pins could also be used for interrupts.

In operation, the microphone 100 operates in a variety of different modes and several states that cover these modes. For instance, when a clock signal (with a frequency falling within a predetermined range) is supplied to the microphone 100, the microphone 100 is operated in a standard operating mode. If the frequency is not within that range, the microphone 100 is operated within a sensing mode. In the sensing mode, the internal oscillator 103 of the microphone 100 is being used and, upon detection of an acoustic event, data transmissions are aligned with the rising clock edge, where the clock is the internal clock.

Figure 1B:
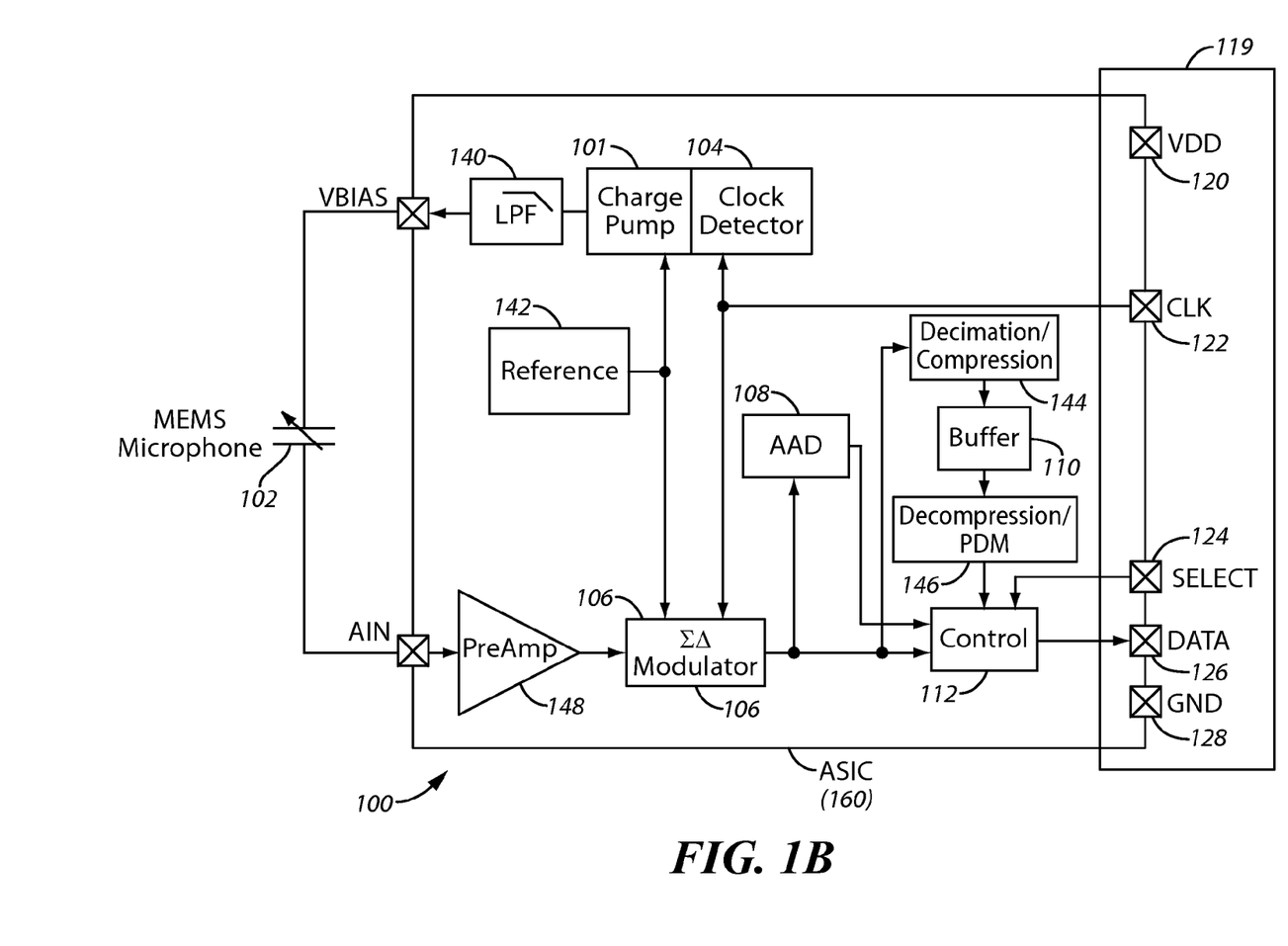
FIG. 1B comprises a block diagram of another acoustic system with acoustic activity detection (AAD) according to various embodiments of the present invention.

Referring now to FIG. 1B, another example of a microphone 100 is described. This example includes the same elements as those shown in FIG. 1A and these elements are numbered using the same labels as those shown in FIG. 1A.

In addition, the microphone 100 of FIG. 1B includes a low pass filter 140, a reference 142, a decimation/compression module 144, a decompression PDM module 146, and a pre-amplifier 148.

The function of the low pass filter 140 removes higher frequency from the charge pump. The function of the reference 142 is a voltage or other reference used by components within the system as a convenient reference value. The function of the decimation/compression module 144 is to minimize the buffer size take the data or compress and then store it. The function of the decompression PDM module 146 is pulls the data apart for the control module. The function of the pre-amplifier 148 is bringing the sensor output signal to a usable voltage level.

The components identified by the label 100 in FIG. 1A and FIG. 1B may be disposed on a single application specific integrated circuit (ASIC) or other integrated device. However, the charge pump 101 is not disposed on the ASIC 160 in FIG. 1A and is on the ASIC in the system of FIG. 1B. These elements may or may not be disposed on the ASIC in a particular implementation. It will be appreciated that the ASIC may have other functions such as signal processing functions.

Referring now to FIG. 2, FIG. 3, FIG. 4, and FIG. 5, a microphone (e.g., the microphone 100 of FIG. 1) operates in a standard performance mode and a sensing mode, and these are determined by the clock frequency. In standard performance mode, the microphone acts as a standard microphone in which it clocks out data as received. The frequency range required to cause the microphone to operate in the standard mode may be defined or specified in the datasheet for the part-in-question or otherwise supplied by the manufacturer of the microphone.

In sensing mode, the output of the microphone is tri-stated and an internal clock is applied to the sensing circuit. Once the AAD module triggers (e.g., sends a trigger signal indicating an acoustic event has occurred), the microphone transmits buffered PDM data on the microphone data pin (e.g., data pin 126) synchronized with the internal clock (e.g. a 512 kHz clock). This internal clock will be supplied to the select pin (e.g., select pin 124) as an output during this mode. In this mode, the data will be valid on the rising edge of the internally generated clock (output on the select pin). This operation assures compatibility with existing I2S-comaptible hardware blocks. The clock pin (e.g., clock pin 122) and the data pin (e.g., data pin 126) will stop outputting data a set time after activity is no longer detected. The frequency for this mode is defined in the datasheet for the part in question. In other example, the interface is compatible with the PDM protocol or the I$^2$C protocol. Other examples are possible.

The operation of the microphone described above is shown in FIG. 2. The select pin (e.g., select pin 124) is the top line, the data pin (e.g., data pin 126) is the second line from the top, and the clock pin (e.g., clock pin 122) is the bottom line on the graph. It can be seen that once acoustic activity is detected, data is transmitted on the rising edge of the internal clock. As mentioned, this operation assures compatibility with existing I2S-comaptible hardware blocks.

For compatibility to the DMIC-compliant interfaces in sensing mode, the clock pin (e.g., clock pin 122) can be driven to clock out the microphone data. The clock must meet the sensing mode requirements for frequency (e.g., 512 kHz). When an external clock signal is detected on the clock pin (e.g., clock pin 122), the data driven on the data pin (e.g., data pin 126) is synchronized with the external clock within two cycles, in one example. Other examples are possible. In this mode, the external clock is removed when activity is no longer detected for the microphone to return to lowest power mode. Activity detection in this mode may use the select pin (e.g., select pin 124) to determine if activity is no longer sensed. Other pins may also be used.

Figure 3:
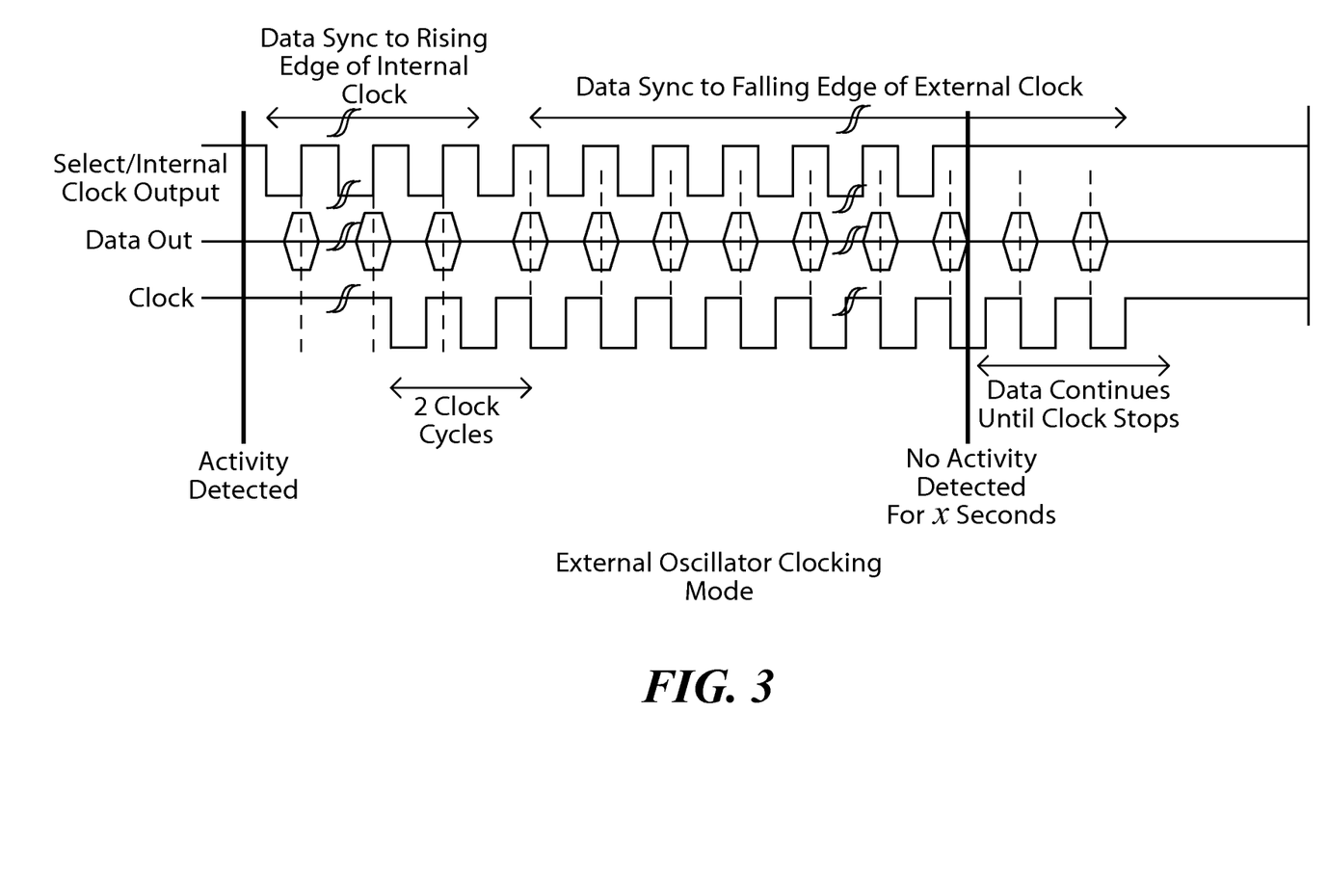
FIG. 3 comprises a timing diagram showing another aspect of the operation of the system of FIG. 1 according to various embodiments of the present invention.

This operation is shown in FIG. 3. The select pin (e.g., select pin 124) is the top line, the data pin (e.g., data pin 126) is the second line from the top, and the clock pin (e.g., clock pin 122) is the bottom line on the graph. It can be seen that once acoustic activity is detected, the data driven on the data pin (e.g., data pin 126) is synchronized with the external clock within two cycles, in one example. Other examples are possible. Data is synchronized on the falling edge of the external clock. Data can be synchronized using other clock edges as well. Further, the external clock is removed when activity is no longer detected for the microphone to return to lowest power mode.

Figure 4:
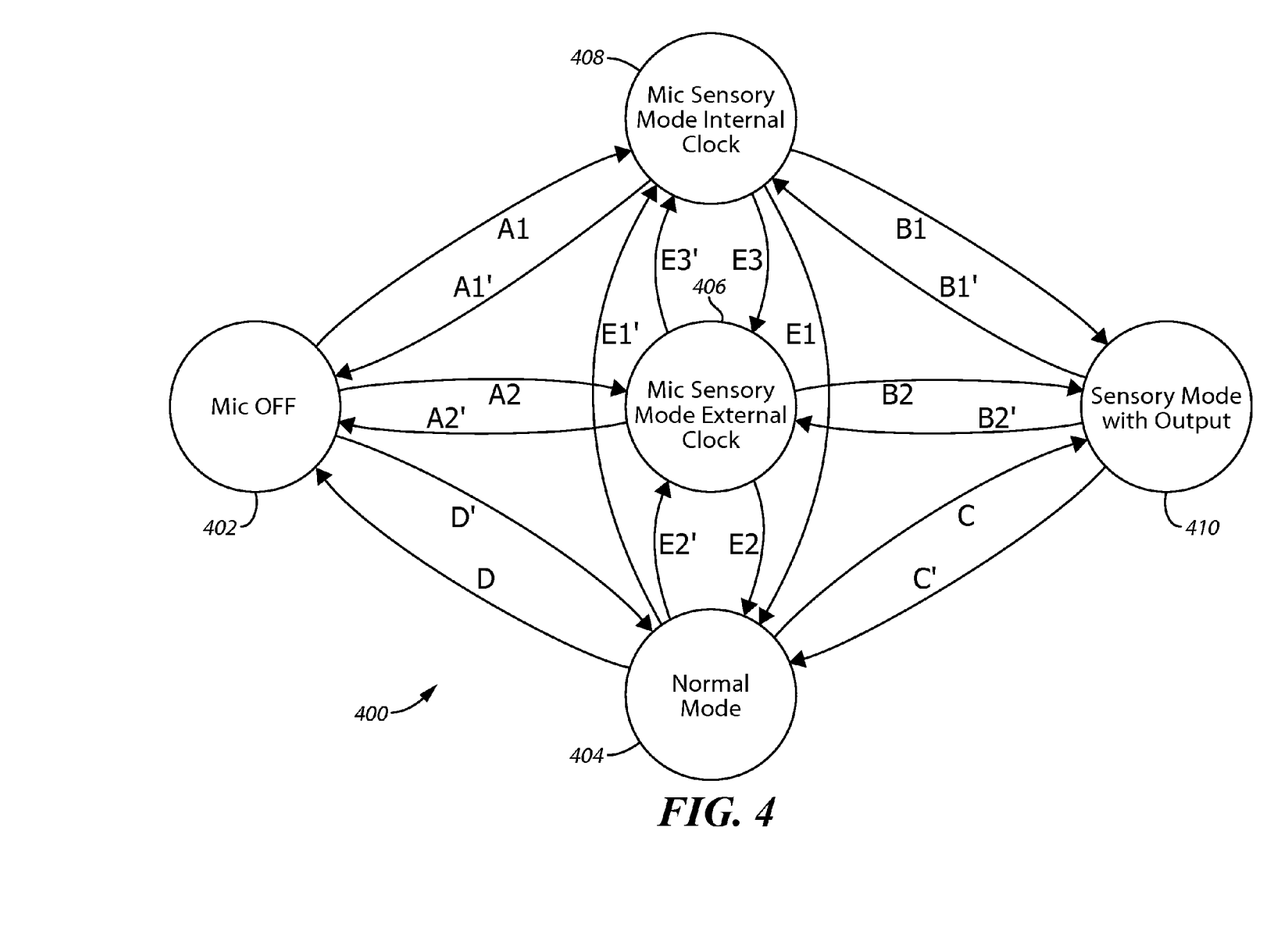
FIG. 4 comprises a state transition diagram showing states of operation of the system of FIG. 1 according to various embodiments of the present invention.
Figure 5:
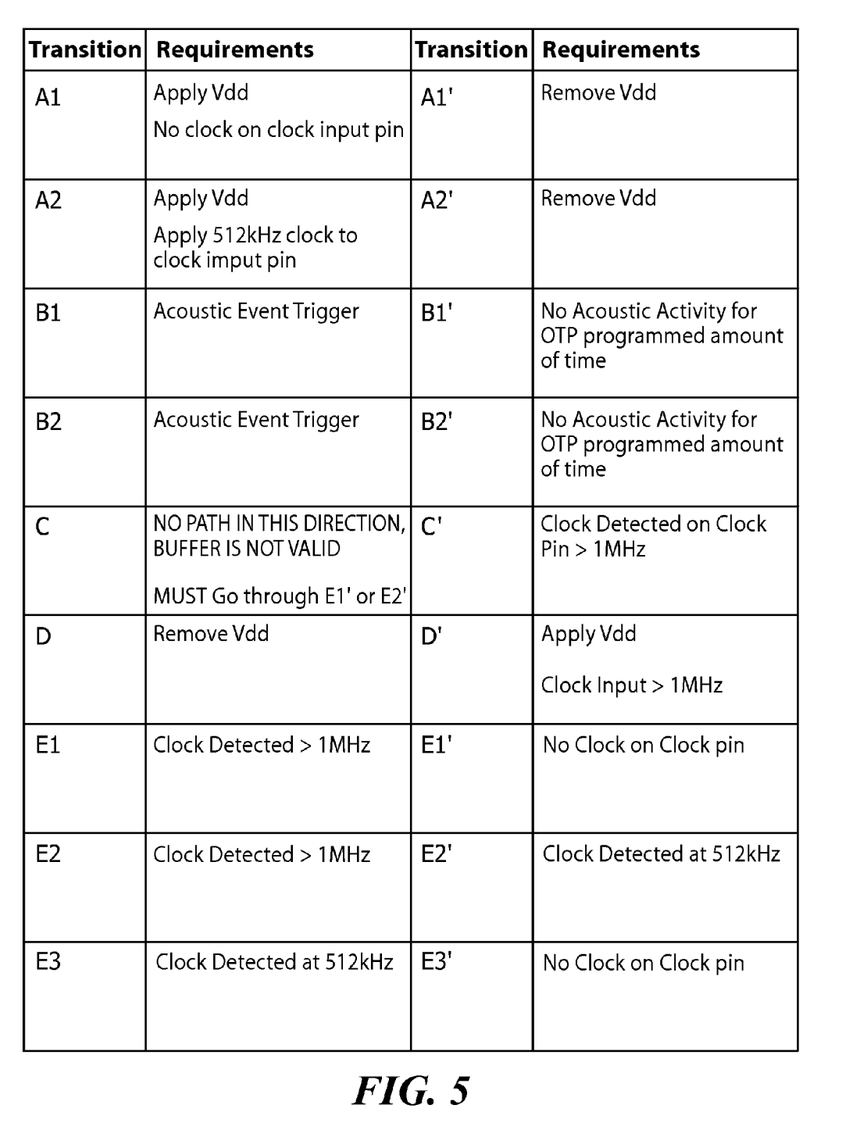
FIG. 5 comprises a table showing the conditions for transitions between the states shown in the state diagram of FIG. 4 according to various embodiments of the present invention.

Referring now to FIGS. 4 and 5, a state transition diagram 400 (FIG. 4) and transition condition table 500 (FIG. 5) are described. The various transitions listed in FIG. 4 occur under the conditions listed in the table of FIG. 5. For instance, transition A1 occurs when Vdd is applied and no clock is present on the clock input pin. It will be understood that the table of FIG. 5 gives frequency values (which are approximate) and that other frequency values are possible. The term "OTP" means one time programming.

The state transition diagram of FIG. 4 includes a microphone off state 402, a normal mode state 404, a microphone sensing mode with external clock state 406, a microphone sensing mode internal clock state 408 and a sensing mode with output state 410.

Figure 2:
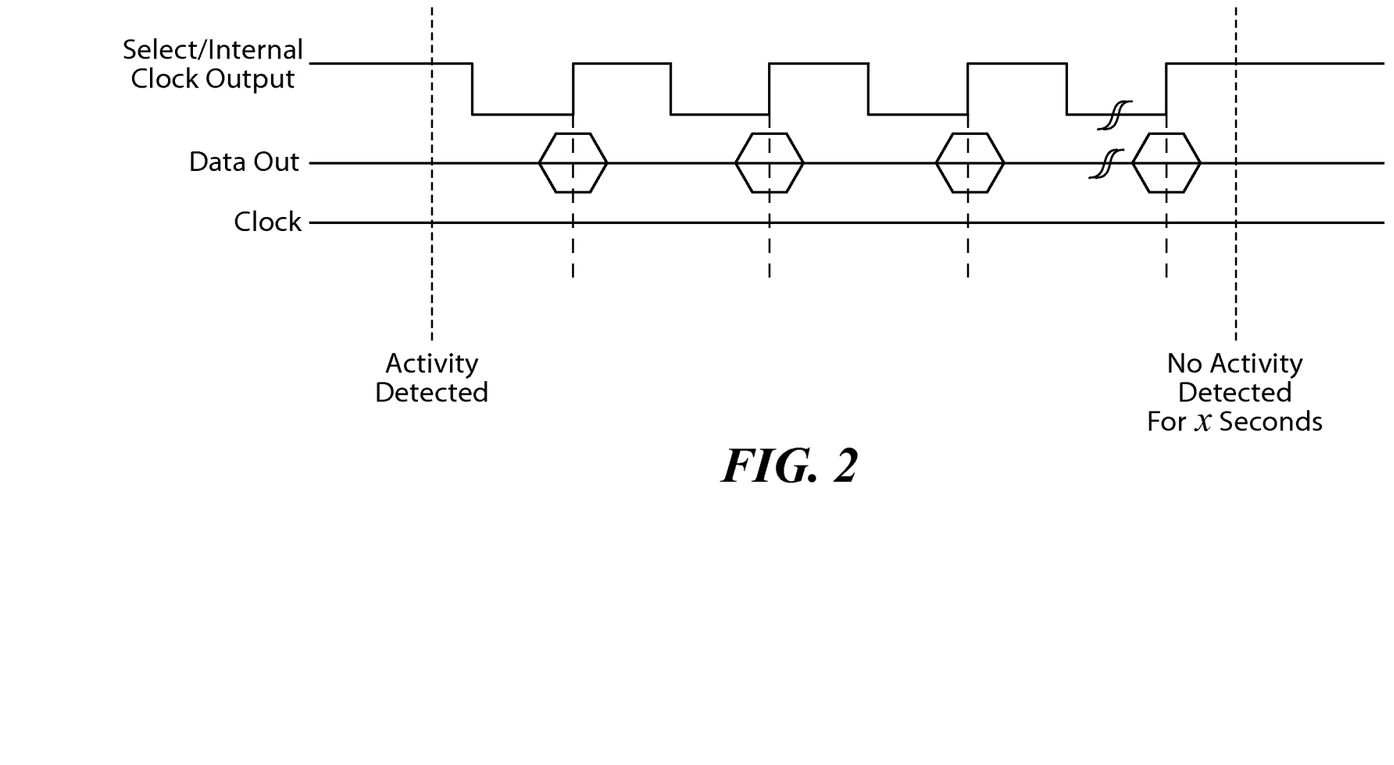
FIG. 2 comprises a timing diagram showing one aspect of the operation of the system of FIG. 1 according to various embodiments of the present invention.

The microphone off state 402 is where the microphone 400 is deactivated. The normal mode state 404 is the state during the normal operating mode when the external clock is being applied (where the external clock is within a predetermined range). The microphone sensing mode with external clock state 406 is when the mode is switching to the external clock as shown in FIG. 3. The microphone sensing mode internal clock state 408 is when no external clock is being used as shown in FIG. 2. The sensing mode with output state 410 is when no external clock is being used and where data is being output also as shown in FIG. 2.

As mentioned, transitions between these states are based on and triggered by events. To take one example, if the microphone is operating in normal operating state 404 (e.g., at a clock rate higher than 512 kHz) and the control module detects the clock pin is approximately 512 kHz, then control goes to the microphone sensing mode with external clock state 406. In the external clock state 406, when the control module then detects no clock on the clock pin, control goes to the microphone sensing mode internal clock state 408. When in the microphone sensing mode internal clock state 408, and an acoustic event is detected, control goes to the sensing mode with output state 410. When in the sensing mode with output state 410, a clock of greater than approximately 1 MHz may cause control to return to state 404. The clock may be less than 1 MHz (e.g., the same frequency as the internal oscillator) and is used synchronized data being output from the microphone to an external processor. No acoustic activity for an OTP programmed amount of time, on the other hand, causes control to return to state 406.

It will be appreciated that the other events specified in FIG. 5 will cause transitions between the states as shown in the state transition diagram of FIG. 4.

Figure 6:
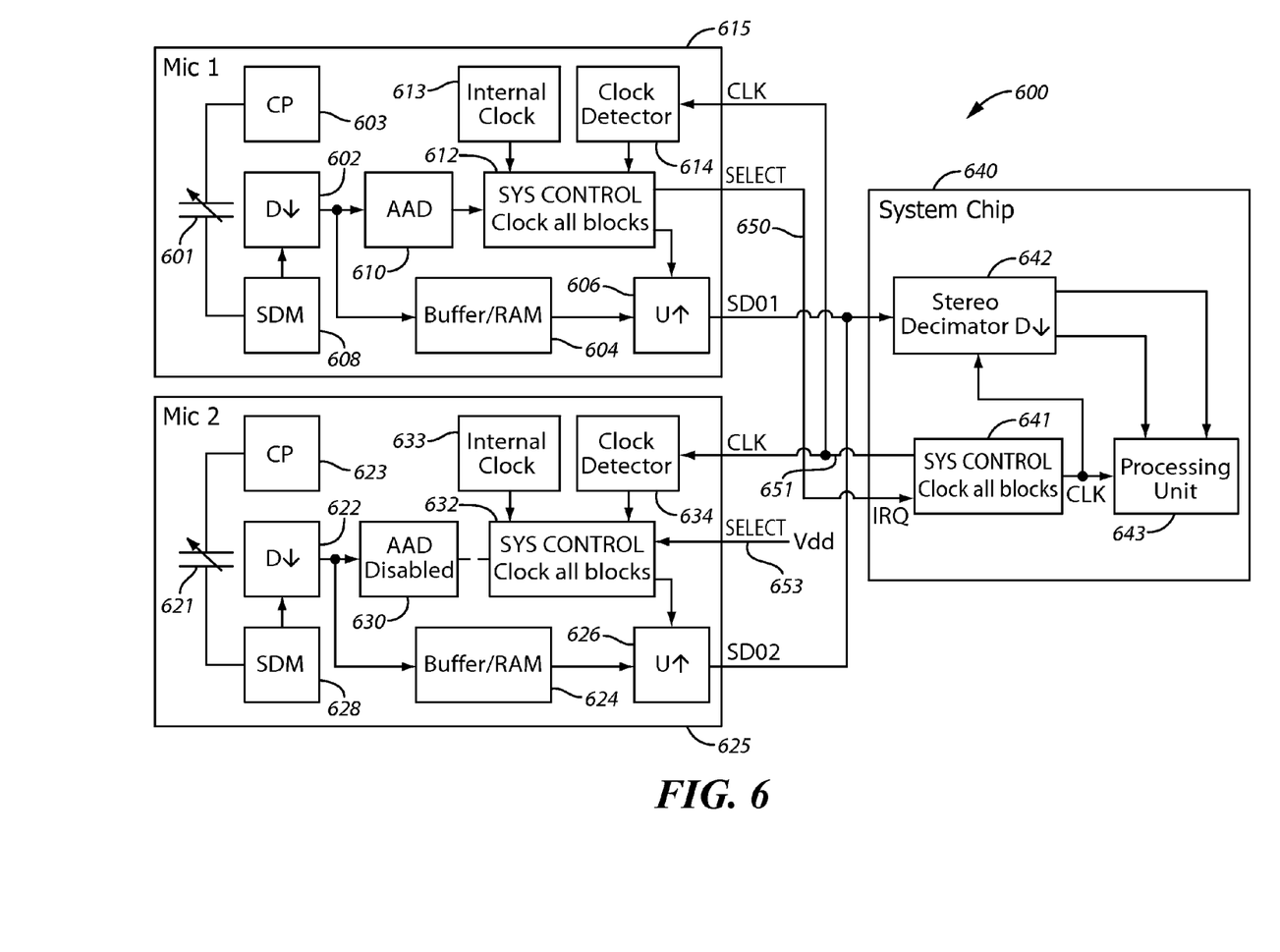
FIG. 6 comprises a block diagram of a multi-microphone arrangement according to various embodiments of the present invention.

Referring now to FIG. 6, an acoustic circuit or system 600 includes a first microphone 615, a second microphone 625, and an external system chip (or device) 640.

The first microphone 615 includes a first transducer element 601, a first charge pump 603, a first down converter 602, a first buffer (or random access memory (RAM)) 604, a first up converter 606 (with output SD01), a first sigma delta converter 608, a first acoustic activity detector 610, a first controller 612, a first internal clock 613, and a first clock detect module 614. These elements comprise the first microphone 615. The first microphone 615 may be configured as a sensing microphone by connecting SELECT pin 650 as an output to a system chip (or other external device) 640 that is capable of detecting an indicator signal on this pin, and by disabling an external clock or an external clock designed for low power mode.

The second microphone 625 includes a second transducer element 621, a second charge pump 623, a second down converter 622, a second buffer (or random access memory (RAM)) 624, a second up converter 626 (with output SD02), a second sigma delta converter 628, a second acoustic activity detector (AAD) 630, a second controller 632, a second internal clock 633, and a second clock detect module 634. These elements comprise the second microphone 625. A SELECT line 653 of the second microphone 625 may be connected to $V_{dd}$ or to ground. This line is used to configure the microphone 625 in a low power microphone using the audio buffer and internal clock 633 as long as the external clock is disabled. The AAD circuit 630 is disabled by the configuration of the SELECT pin 653.

The two internal clock modules 614 and 634 are disposed as or in two independent devices and in one aspect do not have the means to be synchronized. The first transducer element 601 and second transducer element 621 may be MEMS sensors, piezoelectric sensors, speakers, or any other type of sensing device. The first charge pump 603 and second charge pump 623 provide voltages to charge up and bias the diaphragms of the transducer elements 601 and 621.

The first sigma delta modulator 608 is used to convert the analog output of the first transducer element 601 to first digital pulse density modulated (PDM) signals. The second sigma delta modulator 628 is used to convert the analog output of the transducer element 621 to second digital pulse density modulated (PDM) signals.

The first down converter 602 is used to convert the first PDM signals to a first pulse code modulated (PCM) signal and second down converter 622 is used to convert the second PDM signal to a second PCM signal. The conversions are based on asynchronous clocks within each microphone 615 and 625. As a first approximation, it may be assumed that the two internal clocks operate at the same rate. Additionally, in some aspects, a known number of bits of the PDM signal at the internal clock rate are converted to a PCM sample every fixed number of clocks. In other aspects, the conversion is effected using means that do not limit the number of PDM bits being converted, but the PCM samples are generated every fixed number of clocks. For multiple channel audio data, this is usually synchronized by a word strobe (WS) signal. However the start and end clock bit of the PCM sample conversion cannot be synchronized as the two converters do not share a means to define a common start clock bit or WS. As used herein, two groups of data bits, corresponding to two PCM samples, are "synchronized" when the first bit of each data group is aligned in time with the same clock edge of the same clock cycle.

The first buffer 604 and second buffer 624 store data received from the down converters 602 and 622 respectively. These PCM audio samples are asynchronous and have a time difference uncertainty defined by the decimation rate D and the internal clock frequency $f_{clk}$.

$$-D/(2 \times f_{clk}) < \Delta t < D/(2 \times f_{clk})$$

The PCM signal from the first down converter 602 is provided to the AAD circuit 610 for detection of acoustic activity. Various approaches can be used to detect activity such as the occurrence of a trigger word, trigger phrase, specific noise, or specific sounds. Upon detection, the AAD module 610 instructs the control module 612 to send a communication to the system chip 640 that there is voice activity (e.g., an interrupt is sent) via the SELECT line 650.

As mentioned and in one example, the SELECT line 650 may be used to indicate the detection of voice activity. The first up converter 606 may then be used to convert the PCM signal in the audio buffer to a PDM signal that is clocked out at the internal clock rate $f_{clk}$.

The external system chip (or other device) 640 may include a stereo decimator 642, a system control module 641, and a processing unit 643. The system chip 640 may use the indicator signal from the SELECT line 650 to initiate an external clock 651 to microphones 615 and 625. On receiving the external clock 651 from the system chip 640, the control block 612 in the first microphone 615 and the control block 632 in the second microphone 625 synchronize to the same external clock $f_{ext\_clk}$, provided by the system control module 641.

The first controller 612 and the second controller 632 instruct the buffers 604 and 624 to spool out data at appropriate times using the first up converter 606 and the second up converter 626. The first up converter 606 and second up converter 626 convert the PCM signals from the buffers 604 and 624, respectively, to PDM signals SD01 and SD02, respectively. In one aspect, the PCM audio stored in 604 and 624 are not synchronized. However, the up-conversion process removes the signal sample clock boundaries on each PCM signal sample and thus removes the implicit time uncertainty of the PCM signals stored in the two buffers 604 and 624.

In another aspect of the operation of the circuit 600, the first microphone 615 is activated to receive sound energy. After being converting the signal from an analog signal to a digital signal by the sigma delta converter 608 and by the down converter 602, the data is stored in the buffer 604. After voice activity is detected by the first AAD 610, the SELECT line 650 is used to indicate the detection of this voice activity. The system chip 640 receives the indication and may use this indicator signal from the SELECT line 650 to initiate an external clock 651 to microphones 615 and 625. The clock 651 is fed to the second microphone 625 which is activated to receive sound energy. The clock activates the clock detect module 634. The activation of the clock detect module 634 activates the controller 632, the second charge pump 623, the sigma delta modulator 628 and the down converter 622, and to clock the second buffer 624. This allows the second microphone 625 to be activated and send data to the second buffer 624 to be stored in PCM format. In this aspect also, the PCM audio stored in 604 and 624 are not synchronized.

In both these examples, the signals SD01 and SD02 are multiplexed on the same physical serial data line using, with microphone 615 using either the rising edge or falling edge and microphone 625 using either the falling edge or rising edge to clock the data. In other aspects, the clock signal 651 and the signals SD01 and SD02 may be on separate lines.

The resultant outputs from the first buffer 604 and the second buffer 624 are again up converted to PDM signals SD01 through 606 and SD02 through 626. The up-conversion process removes the signal sample clock boundaries on each PCM signal sample and thus removes the implicit time uncertainty of the PCM signals stored in the two buffers 604 and 624.

The system chip 640 receives the PDM data stream and can clock this data into the stereo decimator 642. This decimator 642 is operated by the clock generated by the system control module 641 and de-multiplexes the PDM data into two streams. Further, the stereo decimator 642 is operated by a common word strobe signal for each stream and generates a stream of two PCM signal samples which begin and end at the same bit clock edge and are, thus, synchronized.

The two synchronized streams are now suitable for two microphone signal enhancement algorithm processing to reduce background noise and improve speech recognition. Further processing for two-microphone signal enhancement may be performed by a processing unit 643, followed by key phrase recognition.

It will be appreciated that more than two microphones with a similar structure and capability may be operated in a similar mode, where the internal PCM data may be stored in internal buffers of each microphone in an implicitly asynchronous manner because of the inability to have a common word strobe. By providing an external clock the PCM data is up converted and may be provided on a multiplicity of PDM serial data lines to the system chip 640. A bank of decimators at the system chip 640 that operate on the same clock and word strobe may be used to decimate the PDM data from each of these microphones and obtain multiple channels of synchronous PDM data for speech and audio enhancement in a processing unit for digital signal processing.

It will be appreciated that such signal enhancement for improving speech quality for speech recognition may be made before any recognition phase in the processing chain. Both of these algorithms or approaches may be implemented or executed in the processing unit 643.

In one aspect, in order to avoid excessive power draw, it is also possible to detect a key trigger phrase using robust recognition algorithms in the processing unit 643 using only the data from the first microphone 615. In such an approach, the second microphone 625 is kept inactivated until such a time as the key trigger phrase is recognized. On the recognition of the trigger phrase, the second microphone 625 is activated as described above by staring the external clock 651. Subsequently the received audio from two or more mics may be enhanced by activating such algorithms in the processing unit 643. This will reduce power consumption, as signal enhancement on multiple microphone data is done only after the key phrase is recognized and general natural language understanding is required in potentially noisy environments.

It will be appreciated that the various elements of FIG. 6 may be implemented using various combinations of hardware and software. For example, some of the elements may be implemented using computer instructions that are executed on a processing device such as a microprocessor.

Preferred embodiments of this invention are described herein, including the best mode known to the inventors for carrying out the invention. It should be understood that the illustrated embodiments are exemplary only, and should not be taken as limiting the scope of the invention.

What is claimed is:
1. A method, the method comprising:
receiving first analog signals from a first microphone, converting the first analog signals into first pulse code modulation (PCM) digital data and storing the first PCM digital data in a first buffer using a first microphone internal clock;
receiving a second analog signals from a second microphone according to a second microphone internal clock, converting the second analog signal into second PCM digital data and storing the second PCM digital data in a second buffer;
wherein the first PCM digital data in the first buffer is not synchronized in real time with the second PCM digital data in the second buffer due to the absence of a common clock or other synchronizing signal between the first microphone and the second microphone;
determining whether voice activity has occurred at a first acoustic activity detect (AAD) module based upon the first PCM digital data, and when voice activity is determined, transmitting a voice activity detect signal to an external processor, the external processor responsively providing an exterior clock signal upon receiving the voice activity detect signal;
up-converting the first PCM digital data into first pulse density modulation (PDM) data and the second PCM digital data into second PDM data based upon the exte- rior clock signal to eliminate a lack of synchronization or time uncertainty between the first PCM data and the second PCM data;

decimating the first PDM data and the second PDM data using the exterior clock signal to provide decimated output pulse code modulation (PCM) data, the decimated output PCM data including a first PCM sample and a second PCM sample, wherein each of the first PCM sample and the second PCM sample begin and end on the same bit clock edge of the exterior clock signal.

2. The method of claim 1, further comprising receiving the exterior clock signal at the first microphone and the second microphone, and synchronizing the operation of the first microphone and the second microphone to the exterior clock signal.

3. The method of claim 1, further comprising subsequent to decimating the first PDM digital data and decimating the second PDM digital data, performing two channel voice signal enhancement with the decimated output data from the first microphone and the second microphone.

4. The method in claim 1, wherein the second microphone and not the first microphone is kept in a low power or sleep mode until the exterior clock signal is applied by the external processor.

5. The method of claim 1 wherein the external processor includes a decimator and the decimator is configured to decimate two or more channels using the same clock, and same PCM sample synchronization signal or Word Strobe (WS).

6. The method of claim 1, wherein the first microphone, the second microphone, and a multiplicity of additional microphones are connected via a common clock line and multiple serial PDM data lines to the external processor.

7. The method in claim 1, wherein the first microphone includes a first buffer and the first microphone is kept in a sensing mode with the first AAD module and first buffer being active.

8. The method in claim 1, wherein the second microphone and any additional microphones and not the first microphone is kept in a low power or sleep mode until the exterior clock signal is applied by the external processor.

9. The method of claim 1, further comprising subsequent to decimating the PDM digital data from the first microphone, the second microphone, and a multiplicity of additional microphones, performing multiple channel voice signal enhancement with the first PCM sample and the second PCM sample.

10. An apparatus, the apparatus comprising:
an external processor;
a first buffer coupled to the external processor;
a second buffer coupled to the external processor;
a first analog-to-digital converter coupled to the first buffer, the first analog-to-digital converter configured to receive first analog signals from a first microphone, convert the first analog signals into first pulse code modulation (PCM) digital data and store the first pulse code modulation (PCM) digital data in a first buffer;
a first acoustic activity detect (AAD) module coupled to the first analog-to-digital converter, the first acoustic activity detect module configured to determine whether voice activity has occurred based upon the first pulse code modulation (PCM) digital data, and when voice activity is determined, transmit a voice activity detect signal to the external processor, the external processor responsively providing an exterior clock signal upon receiving the voice activity detect signal;
a second analog-to-digital converter coupled to the second buffer, the second analog-to-digital converter configured to receive a second analog signals from a second microphone according to the exterior clock signal, convert the second analog signals into second pulse code modulation (PCM) digital data and store the second digital data in a second buffer;
wherein the first PCM digital data in the first buffer is not synchronized in real time with the second PCM digital data in the second buffer;
wherein the first buffer, the first analog-to-digital converter, and the first acoustic activity detect module are disposed at a first microphone, and wherein the second buffer and the second analog-to-digital converter are disposed at a second microphone;
wherein a first up-converter or interpolator is coupled to the first buffer, and a second up-converter or interpolator is coupled to the second buffer, the first up-converter and the second up-converter are configured to up-convert the first PCM digital data into first pulse density modulation (PDM) data and up-convert the second PCM digital data into second pulse density modulation (PDM) data based upon the exterior clock signal to eliminate a lack of synchronization or time uncertainty between the first PCM digital data in the first buffer and the second PCM digital data in the second buffer;
wherein the first analog-to-digital converter, the first buffer, the first acoustic activity detect module, and the first up-converter or interpolator are disposed at a first microphone, and wherein the second analog-to-digital converter, the second buffer and the second up-converter or interpolator are disposed at a second microphone;
wherein the external processor is configured to decimate the first PDM data from the first buffer in the first microphone and the second PDM data from the second buffer in the second microphone using the exterior clock signal to provide a first decimated PCM sample and a second decimated PCM sample, wherein each of the first decimated PCM sample and the second decimated PCM sample begin and end on the same bit clock edge of the exterior clock signal.

11. The apparatus of claim 10, wherein the exterior clock signal is received at the first microphone and the second microphone, and the operation of the first microphone and the second microphone is synchronized to the exterior clock signal.

12. The apparatus of claim 10, further comprising subsequent to decimating the first PDM digital data and the second PDM digital data, performing two channel voice signal enhancement with the first decimated PCM sample and the second decimated PCM sample from the first microphone and the second microphone.

13. The apparatus of claim 10, wherein the second microphone and not the first microphone are kept in a low power sleep mode until the exterior clock signal is applied by the external processor.

14. The apparatus of claim 10, wherein the external processor includes a decimator and the decimator is configured to decimate two or more channels using the same clock, and same sample synchronization signal or Word Strobe (WS).

15. The apparatus of claim 10, wherein the first microphone, the second microphone, and a multiplicity of additional microphones are connected via a common clock line and multiple serial PDM data lines to the external processor.

16. The apparatus in claim 10, wherein the first microphone is kept in sensing mode with the first AAD module and first buffer being active.

17. The apparatus of claim 10, wherein the second microphone and any additional microphones and not the first microphone are kept in a low power sleep mode until the exterior clock signal is applied by the external processor.

18. The apparatus in claim 10, further comprising subsequent to decimating the digital data from the first microphone, the second microphone, and a multiplicity of additional microphones, performing multiple channel voice signal enhancement with the first PCM sample and the second PCM sample.

* * * * *